United States Patent
Chang et al.

(10) Patent No.: US 7,907,112 B2
(45) Date of Patent: Mar. 15, 2011

(54) LIQUID CRYSTAL DISPLAY DEVICE AND LUMINANCE DIFFERENCE COMPENSATING METHOD THEREOF

(75) Inventors: Youn Gyoung Chang, Anyang-si (KR); Hyun Suk Jin, Gunpo-shi (KR)

(73) Assignee: LG Display Co., Ltd., Seoul (KR)

( * ) Notice: Subject to any disclaimer, the term of this patent is extended or adjusted under 35 U.S.C. 154(b) by 356 days.

(21) Appl. No.: 12/234,335

(22) Filed: Sep. 19, 2008

(65) Prior Publication Data

US 2009/0079681 A1    Mar. 26, 2009

Related U.S. Application Data

(62) Division of application No. 11/168,400, filed on Jun. 29, 2005, now Pat. No. 7,443,463.

(30) Foreign Application Priority Data

Jun. 30, 2004   (KR) .................. 10-2004-0050435

(51) Int. Cl.
    *G09G 3/36*    (2006.01)
(52) U.S. Cl. ............... 345/98; 345/1.1; 349/73; 349/95
(58) Field of Classification Search ............ 345/87–104, 345/1.1–1.3; 349/5, 73, 95
    See application file for complete search history.

(56) References Cited

U.S. PATENT DOCUMENTS

| | | | | |
|---|---|---|---|---|
| 5,576,725 A | * | 11/1996 | Shimada | 345/32 |
| 5,847,784 A | * | 12/1998 | Finnila et al. | 349/73 |
| 6,128,054 A | * | 10/2000 | Schwarzenberger | 349/73 |
| 6,611,241 B1 | * | 8/2003 | Firester et al. | 345/1.3 |
| 6,999,138 B2 | | 2/2006 | Cok | |
| 7,145,611 B2 | | 12/2006 | Dubin et al. | |
| 2004/0001679 A1 | * | 1/2004 | Sisodia et al. | 385/120 |

* cited by examiner

*Primary Examiner* — Jimmy H Nguyen
(74) *Attorney, Agent, or Firm* — Birch, Stewart, Kolasch & Birch, LLP

(57) ABSTRACT

A liquid crystal display (LCD) device, a luminance difference compensating method thereof, and a method for compensating for a luminance variance in a LCD device are provided. The LCD device comprises a plurality of LCD modules tiled together, each of a plurality of microlenses provided on each of the plurality of LCD modules and including a curved portion and a flat portion, a timing controller for outputting RGB data, and a lookup table for separating the RGB data corresponding to the curved and flat portions of each of the microlenses, for converting the RGB data of the curved portion, and for outputting the RGB data corresponding to the flat portion and the converted RGB data corresponding to the curved portion. Accordingly, luminance differences are reduced or eliminated.

7 Claims, 6 Drawing Sheets

LIQUID CRYSTAL DISPLAY DEVICE AND LUMINANCE DIFFERENCE COMPENSATING METHOD THEREOF

This application is a Divisional of 11/168,400 filed on Jun. 29, 2005 now U.S. Pat. No. 7,443,463 and for which priority is claimed under 35 U.S.C. §120. This application also claims the benefit of the Korean Patent Application No. P2004-50435, filed on Jun. 30, 2004, which is hereby incorporated by reference as if fully set forth herein.

BACKGROUND OF THE INVENTION

1. Field of the Invention

The present invention relates to a liquid crystal display, and more particularly to a liquid crystal display device and luminance difference compensating method thereof.

2. Discussion of the Related Art

As the information-oriented society continually develops, the demand for display devices has risen in various forms. Many efforts have been made to research and develop various flat panel display devices including LCD (liquid crystal display), PDP (plasma display panel), ELD (electroluminescent display), VFD (vacuum fluorescent display) and the like. Some of the flat panel displays are already being used as displays in various instruments.

The LCD in particular has been widely used for mobile image displays to replace CRT (cathode ray tube) due to its advantages of being light in weight, slim in size, and low in power consumption. LCD is also being developed to be applicable to various fields for a TV monitor, a computer monitor, and the like to receive and display broadcast signals.

To be usable as a general display device, the LCD must be able to display an image with high definition and high luminance on a wide area while maintaining the advantageous characteristics of being light in weight, slim in size and low in power consumption.

The LCD generally includes a liquid crystal display panel for displaying an image thereon and a drive unit for applying drive signals to the liquid crystal display panel. The liquid crystal display panel typically includes a first glass substrate, a second glass substrate, and a liquid crystal layer injected between the first and second glass substrates.

The first glass substrate (or the thin-film-transistor (TFT) array substrate) includes a plurality of gate lines arranged in one direction and the gate lines are evenly spaced apart from each other. The first glass substrate also includes a plurality of data lines arranged in a direction perpendicular to the plurality of gate lines and the data lines are also evenly spaced apart from each other.

The intersections between the gate and data lines define a plurality of pixel areas. The first glass substrate also includes a plurality of pixel electrodes arranged in a matrix on the plurality of pixel areas and a plurality of thin film transistors are provided on the pixel areas to deliver signals of the data lines to the pixel electrodes. The data line signals are switched under the control of the signals of the gate lines.

The second glass substrate (or the color filter substrate) includes a black matrix layer to cut off light from areas other than the pixel areas, an RGB color filter layer to represent colors, and a common electrode. For In-Plane Switching (IPS) LCD, the common electrode is provided to the first glass substrate.

For the above-configured liquid crystal display device to be used as a display device with a wide area, a technology of assembling several liquid crystal display modules in a tile form has been proposed.

FIG. 1 illustrates a layout of a related art liquid crystal display device having a pair of tiled liquid crystal display modules and FIG. 2 is a cross-sectional diagram taken along a cutting line I-I' in FIG. 1. The liquid crystal display device according to the related art includes a first LCD module 10, a second LCD module 11 attached to the first LCD module 10 in parallel, and first and second microlenses 20a and 20b attached to the first and second LCD modules 10 and 11, respectively. The first and second microlenses 20a and 20b compensate for a luminance variance due to a seam region S between the first and second LCD modules 10 and 11.

The first LCD module 10 includes an LCD panel 10a having upper and lower substrates, a backlight drive unit 10b provided under the LCD panel 10a to supply backlight, and a mold 13a for supporting and fixing the LCD panel 10a and the backlight drive unit 10b. Likewise, the second LCD module 11 includes an LCD panel 11a having upper and lower substrates, a backlight drive unit 11b provided under the LCD panel 11a, and a mold 13b for supporting and fixing the LCD panel 11a and the backlight drive unit 11b.

FIG. 3 is a cross-sectional diagram for explaining light projection from the liquid crystal display device according to the related art. The LCD according to the related art is configured with the first and second LCD modules 10 and 11 and first and second microlenses 20a and 20b attached to the first and second LCD modules 10 and 11, respectively.

In this case, each LCD panel 10a, 10b is divided into an active area and an inactive area. Also, the seam region S exists between the first and second LCD modules 10 and 11.

To prevent the seam region S from appearing on a display screen, the light emitted from a peripheral region of each of the LCD panels 10a and 11a is diverted over the seam region S using the first and second microlenses 20a and 20b.

Each microlens 20a, 20b includes a flat portion and a curved portion. The curved portions of the first and second microlenses 20a and 20b enlarge a portion of the image due to the distortion of the curved portions.

To compensate, the pixels of the LCD display are also divided to illuminate the corresponding flat and curved portions. A size of the pixels of the curved portion are designed to be smaller than a size of the pixels of the flat portion according to an enlarged ratio of the image distorted in the curved portions of the first and second microlenses 20a and 20b.

Even though the image distortion can be minimized by designing the sizes of the pixels according to the curved and flat portions, a difference between opening ratios of the pixels occurs since the black matrix layer has the same width in both the flat and curved portions. As a result, a luminance difference occurs.

Due to the luminance difference occurring between the curved and flat portions of the first and second microlenses 20a and 20b, an overall luminance of a wide screen becomes irregular.

SUMMARY OF THE INVENTION

Accordingly, the present invention is directed to a liquid crystal display device and luminance difference compensating method thereof that substantially corrects for one or more problems due to limitations and disadvantages of the related art.

An object of the present invention is to provide a liquid crystal display device and luminance difference compensating method thereof, in which a luminance difference is reduced or eliminated by configuring a pixel size corresponding to a curved portion to be smaller than that of a flat portion of a microlens in a wide area liquid crystal display device. It should be noted that several liquid crystal display modules may be tiled together to form a single LCD device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device according to an aspect of the present invention includes a plurality of LCD modules tiled together and a microlens on each of the LCD modules. Each microlens may include a curved portion and a flat portion, and each LCD module may include an LCD panel in which a pixel size corresponding to the curved portion of the microlens is smaller than a pixel size corresponding to the flat portion of the microlens. The LCD panel may also include black matrix layers, wherein a width of the black matrix layers corresponding to the curved portion is less than a width of the black matrix layers corresponding to the flat portion.

In another aspect of the present invention, a liquid crystal display device may include a plurality of LCD modules tiled together, a microlens on each of the plurality of LCD modules, wherein each of the microlenses may include a curved portion and a flat portion. The liquid crystal display may also include a timing controller outputting RGB data, a lookup table for separating/converting the RGB data corresponding to the curved and flat portions of each of the microlenses and to output the separated/converted RGB data, and a source driver IC storing the separated/converted RGB data in a register to output to the data lines of each of the LCD modules.

In another aspect of the present invention, in a liquid crystal display device which includes a plurality of LCD modules tiled together and a microlens on each of the plurality of the LCD modules, wherein each of the microlenses includes a curved portion and a flat portion, a luminance difference compensating method may include the steps of determining a per luminance gray difference by which luminances of the curved and flat portions become substantially identical, converting data corresponding to the curved portion of the microlens by the determined gray difference, and outputting the data corresponding to the flat portion of the microlens and the converted data corresponding to the curved portion of the microlens to each data line of the corresponding LCD module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A configuration of a liquid crystal display device according to a first embodiment of the present invention is explained as follows.

Figure 4:
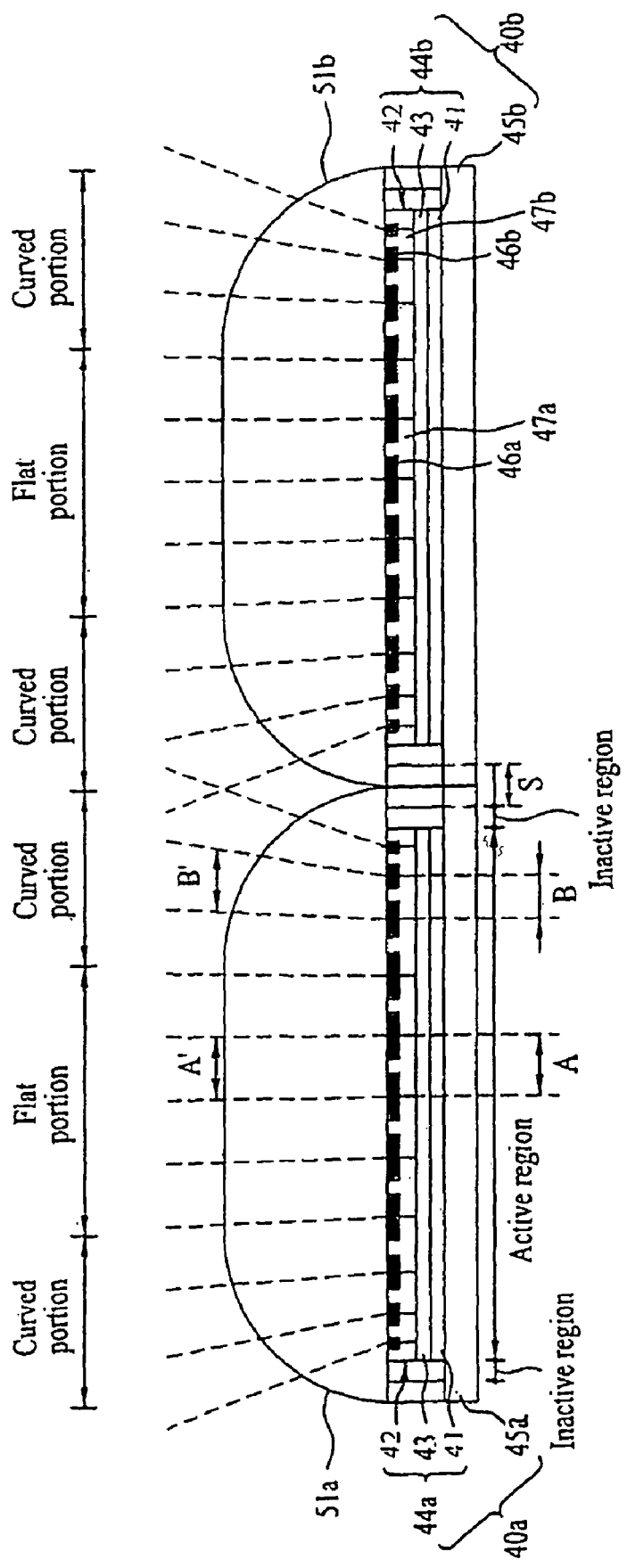
FIG. 4 illustrates a cross-sectional diagram of a liquid crystal display device according to an embodiment of the present invention.
Figure 5:
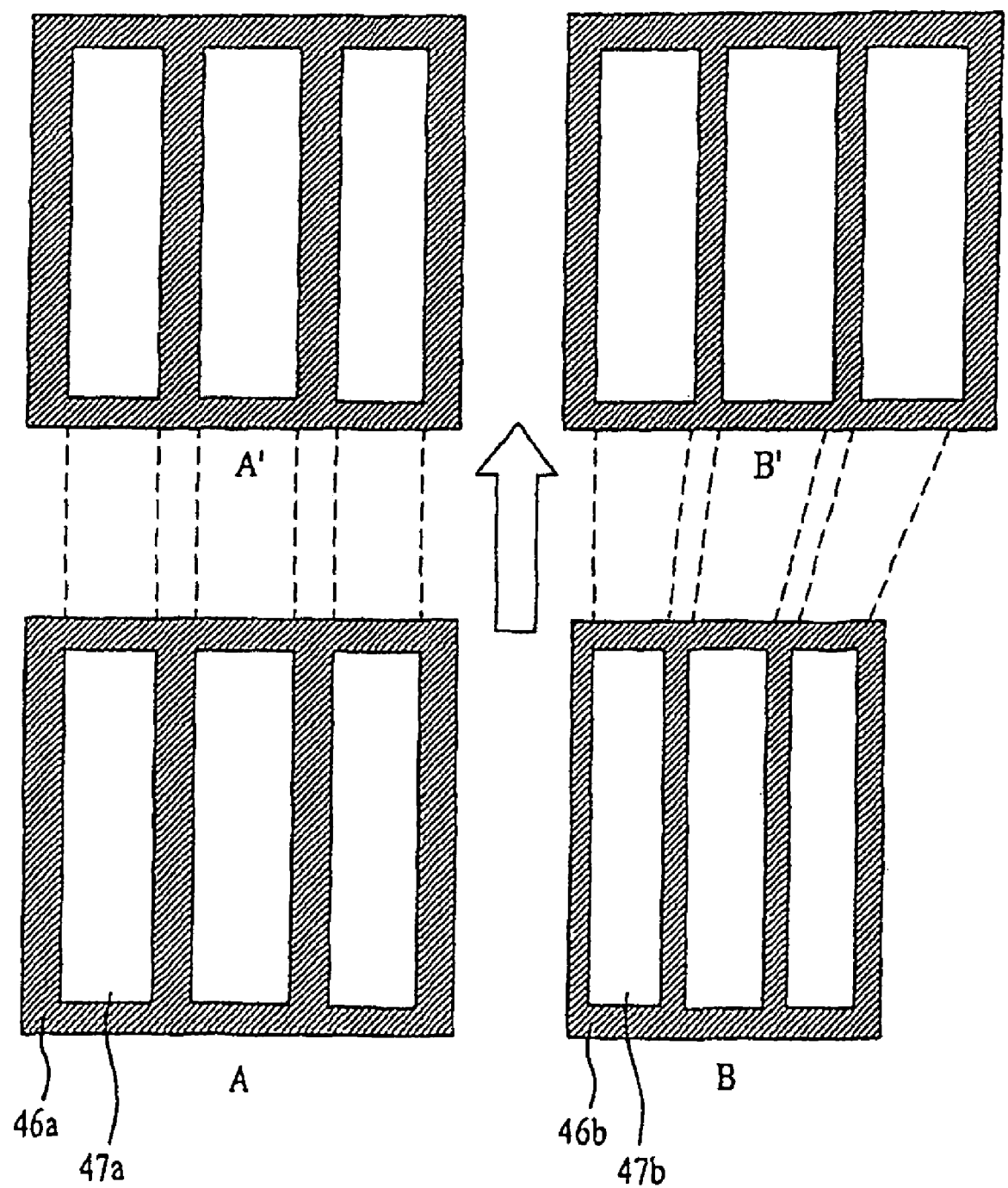
FIG. 5 illustrates a diagram for comparing sizes of three sub-pixel areas before and after light projection according to a first embodiment of the present invention.

FIG. 4 illustrates a cross-sectional diagram of the liquid crystal display device according to the first embodiment of the present invention, and FIG. 5 is a diagram for comparing sizes of three sub-pixel areas before and after light projection according to the first embodiment of the present invention.

The liquid crystal display device according to the first embodiment of the present invention is capable of providing a wide area screen by tiling a plurality of LCD modules together. In FIG. 4, two LCD modules tiled together are illustrated for simplicity. Generally, a plurality of the LCD modules may be tiled together and a microlens may be attached to each of the LCD modules to compensate a luminance variance due to a seam region S between the LCD modules.

Each LCD module may include an LCD panel having upper and lower glass substrates and a liquid crystal layer injected between the upper and lower glass substrates, a backlight unit provided under the LCD panel to provide a backlight, a drive unit to drive the LCD panel and the backlight unit, and a mold frame to support and fix the LCD panel and the drive unit thereto.

For example, the liquid crystal display device, as shown in FIG. 4, may include a first LCD module 40a, a second LCD module 40b, and first and second microlenses 51a and 51b attached to the first and second LCD modules 40a and 40b, respectively.

The first LCD module 40a may include a first LCD panel 44a for displaying an image and a first drive unit 45a for applying a drive signal to the first LCD panel 44a. Likewise, the second LCD module 40b may include a second LCD panel 44b for displaying the image and a second drive unit 45b for applying a drive signal to the second LCD panel 44b. Each LCD panel 44a, 44b may include a first glass substrate 41, a second glass substrate 42 bonded to the first glass substrate 41 to leave a predetermined gap in-between, and a liquid crystal layer 43 injected between the first and second glass substrates 41 and 42.

The first glass substrate (TFT array substrate) 41 may include a plurality of gate lines arranged in one direction and the gate lines may be evenly spaced apart from each other. The first glass substrate may also include a plurality of data lines, also evenly spaced apart, arranged in a direction generally perpendicular to the plurality of gate lines.

A plurality of pixel electrodes may be arranged in a matrix on a plurality of pixel areas defined by the intersections between the gate and data lines. A plurality of thin film transistors may be provided to the pixel areas to deliver signals of the data lines to the pixel electrodes under the control of the signals of the gate lines, i.e. by switching of the gate lines.

The second glass substrate (color filter substrate) 42 may include black matrix layers 46a and 46b to cut off light from areas other than the pixel areas. The black matrix layers 46a may be arranged in areas corresponding to the flat portions of the microlens 51a, 51b and the black matrix layers 46b may be arranged in areas corresponding to the curved portions of the microlens 51a, 51b. The second glass substrate 42 may also include RGB color filter layers 47a and 47b to represent colors and may include a common electrode (not shown in the drawing).

Active and inactive areas may be defined in each LCD panel 44a, 44b. Also, the seam region S may be defined between the first and second LCD modules 40a and 40b.

In tiling the first and second LCD modules 40a and 40b together, the seam region S occurs in-between. To prevent the seam region S from appearing on a display screen, the light emitted from a peripheral region of each LCD panel may be diverted to the seam region S by the first and second microlenses 51a and 51b.

Each microlens 51a, 51b may be divided into a flat portion and a curved portion. The light emitted from curved portions of the first and second microlenses 51a and 51b enlarges an image due to the distortions of the curved portions.

To compensate for the distortion, the pixel area of the LCD panels 44a and 44b may be divided into curved and flat portions corresponding to the curved and flat portions of the microlenses 51a and 51b. A size of the pixel in the pixel area corresponding to the curved portions of the LCD panels 44a and 44b may be designed to be smaller than that of the flat portions based on an amount of distortion caused by the curvature of the microlenses 51a and 51b. For example, the size of the pixel may be based according to an enlarged ratio of the image distorted in the curved portions of the first and second microlenses 51a and 51b.

In this instance, the pixel may refer to an area defined by the gate and data lines on the first glass substrate 41 or may refer to an area having the color filter layer of RGB on the second glass substrate 42 corresponding to the pixel.

The pixel sizes of final images are made identical or substantially identical by differentiating the sizes of the pixel areas of the flat and curved portions. Moreover, an opening ratio of the flat portion is made equal or substantially equal to that of the curved portion so that the luminances of the flat and curved portions are uniform or substantially uniform in the final display.

To make the opening ratios of the curved and flat portions the same, a width of the black matrix layer 46a on the flat portion, as shown in FIG. 5, is formed to be wider than the black matrix layer 46b on the curved portion.

Thus, even though the flat portion may be substantially smaller than the curved portion in the size of the pixel area of the LCD panels, the luminance differences between the curved portion, the flat portion and the seam region are substantially reduced or eliminated in final display since the opening ratios are made equal by adjusting the widths of the black matrix layers. Hence, the luminance becomes uniform throughout the display.

When displaying an image, due to the above configuration, the flat portion A, as shown in FIG. 5, may be projected with an original size A' and the curved portion B may be projected with an enlarged size B' such that the projected sizes A' and B' are substantially equal.

A liquid crystal display device and luminance difference compensating method thereof according to a second embodiment of the present invention are explained as follows.

In the liquid crystal display device according to the second embodiment of the present invention, a microlens may be attached to each of a plurality of LCD modules and each LCD panel of the LCD modules may be defined as having a curved portion and a flat portion. Also a pixel size of the curved portion of the LCD panel may be smaller than that of the flat portion.

Figure 6:
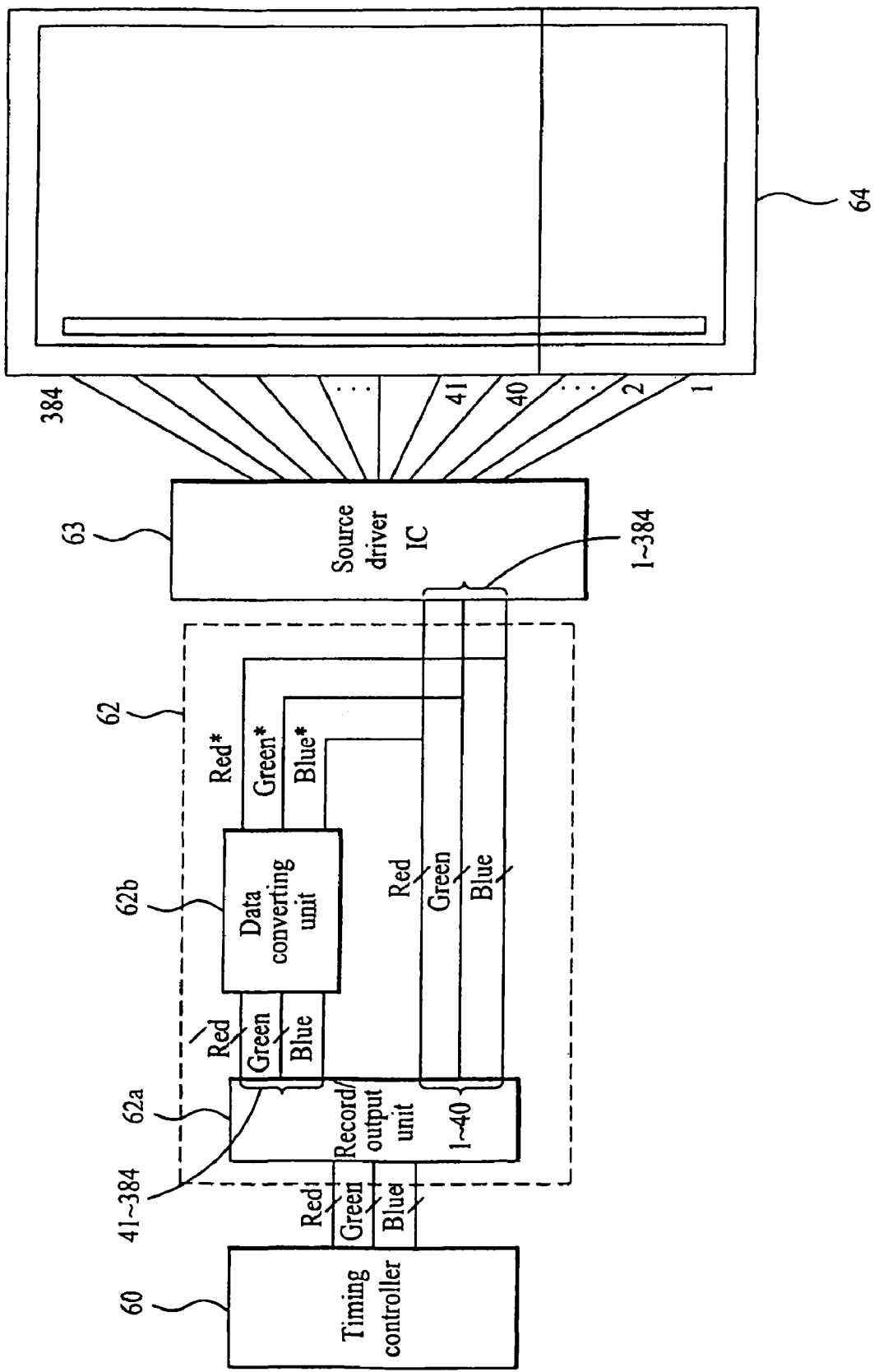
FIG. 6 illustrates a block diagram of a liquid crystal display device according to a second embodiment of the present invention.

Referring to FIG. 6, the liquid crystal display device according to the second embodiment of the present invention may include a timing controller 60, a lookup table 62, and a source driver IC 63. The timing controller 60 may output red-green-blue (RGB) data of the pixels to the lookup table 62. The lookup table 62 may separate the RGB data from the timing controller 60 corresponding to pixels of the curved and flat portions of the LCD panel for each LCD module, convert the separated RGB data as necessary, and deliver the separated/converted data to the source driver IC 63. The source driver IC 63 may store the separated/converted RGB data from the lookup table 62, for example in a register, and output the separated/converted RGB data to data lines of the LCD panel of each LCD module.

The lookup table 62 may include a record/output unit 62a for recording the RGB data from the timing controller 60 and for separating the RGB data corresponding to the curved and flat portions. The lookup table 62 may also include a data converting unit 62b for receiving the RGB data stored in the record/output unit 62a corresponding to the curved portion, converting the RGB data of the curved portion, and for outputting the converted RGB data of the curved portion.

Of the data stored in the record/output unit 62a, the data corresponding to the flat portion may be directly outputted to the source driver IC 63, and the data corresponding to the curved portion may be outputted to the data converting unit 62b to be converted as described above.

For example, assume that $1^{st}$-$n^{th}$ pixels (n data lines) are provided to the liquid crystal display device and that n channels are provided to the source driver IC 63 to deliver signals to the $1^{st}$ to $n^{th}$ pixels. Also assume that the $1^{st}$ to $40^{th}$ pixels correspond to the flat portion, and that the $41^{st}$ to $n^{th}$ pixels correspond to the curved portion. Under this circumstance, the RGB data of the $1^{st}$ to $40^{th}$ pixels stored in the record/output unit 62a may be directly outputted to the source driver IC 63 while RGB data of the $41^{st}$ to $n^{th}$ pixels may be outputted to the data converting unit 62b to be converted. The data converting unit 62b may convert the RGB data of the $41^{st}$ to $n^{th}$ pixels and may output the converted RGB data to the source driver IC 63.

The record/output unit 62a of the lookup table 62 may store a gray difference of the curved portion for which luminance becomes equal to that of the flat portion for each luminance. The data converting unit 62b may raise (convert) the gray level of the RGB data corresponding to the curved portion by the gray difference and may output the raised (converted) RGB data to the source driver IC 63.

While a lookup table 62 is used in FIG. 6, other means to determine the gray differences corresponding to each luminance value may be utilized. For example, the gray difference may be calculated based on the pixel position, or the curvature of the microlens corresponding to the pixel position, or both.

A luminance difference compensating method in the above-configured liquid crystal display device according to the second embodiment of the present invention is explained as follows.

Figure 7A:
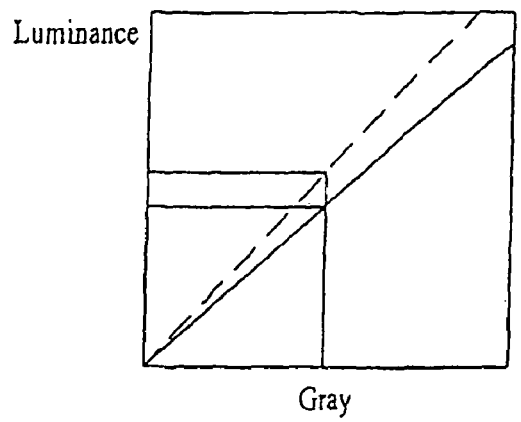
FIG. 7A illustrates a diagram of a luminance difference between flat and curved portions in the same gray.
Figure 7B:
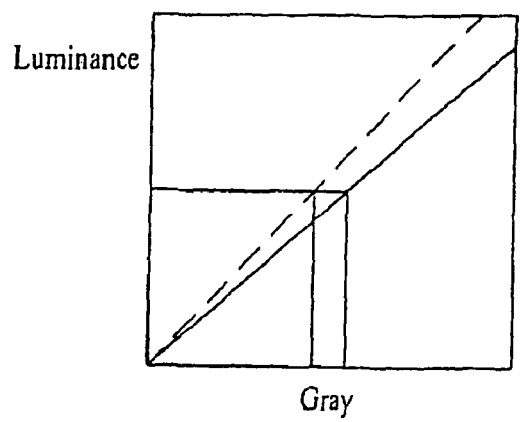
FIG. 7B illustrates a diagram of a gray difference in a same luminance.
Figure 7C:
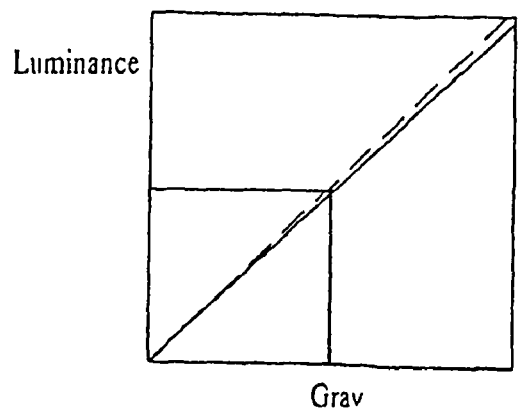
FIG. 7C illustrates a diagram of a gray vs. luminance relation converted by a lookup table of the present invention.

FIG. 7A is a diagram illustrating a luminance difference between flat and curved portions for a same gray level, FIG. 7B is a diagram illustrating a gray difference for a same luminance, and FIG. 7C is a diagram of a gray vs. luminance relation converted by the lookup table 62. As noted above, other means to determine the gray and luminance differences and convert the data based on the differences may be utilized.

Figure 1:
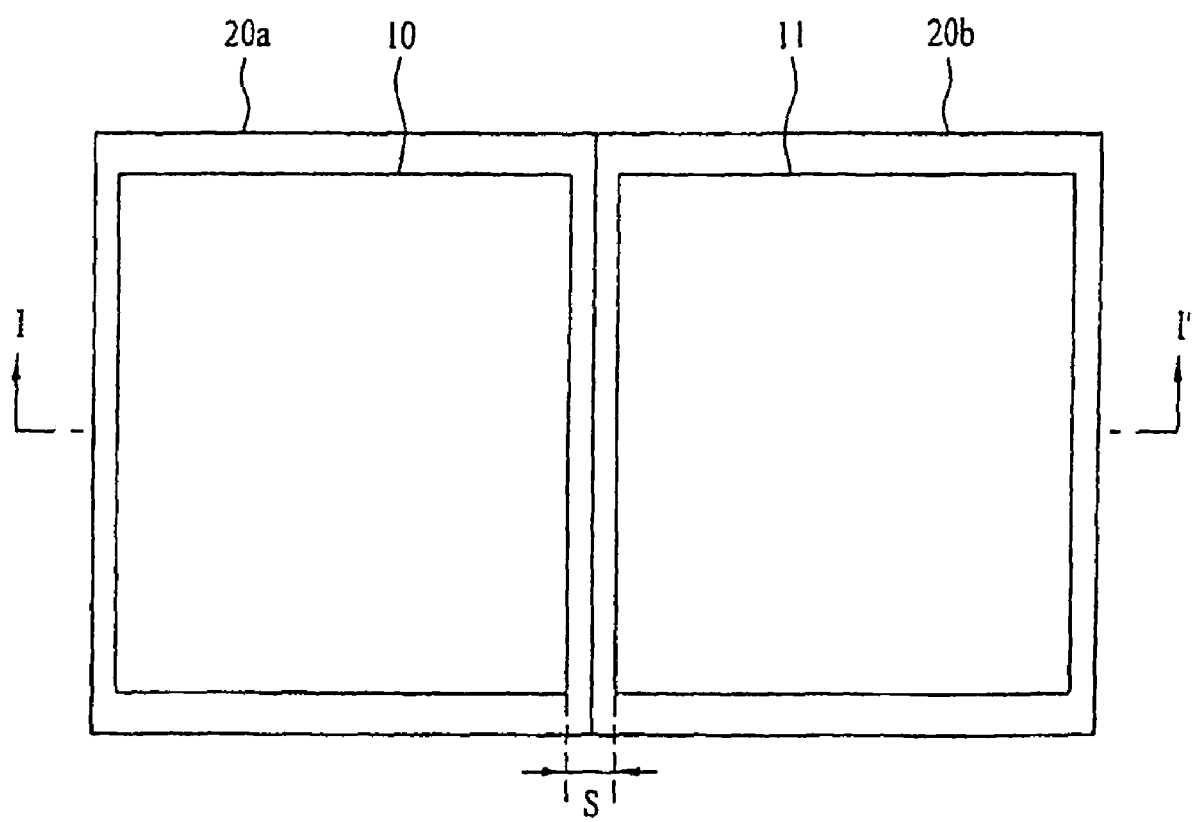
FIG. 1 illustrates a layout of a liquid crystal display device having a pair of tiled liquid crystal display modules according to a related art.
Figure 2:
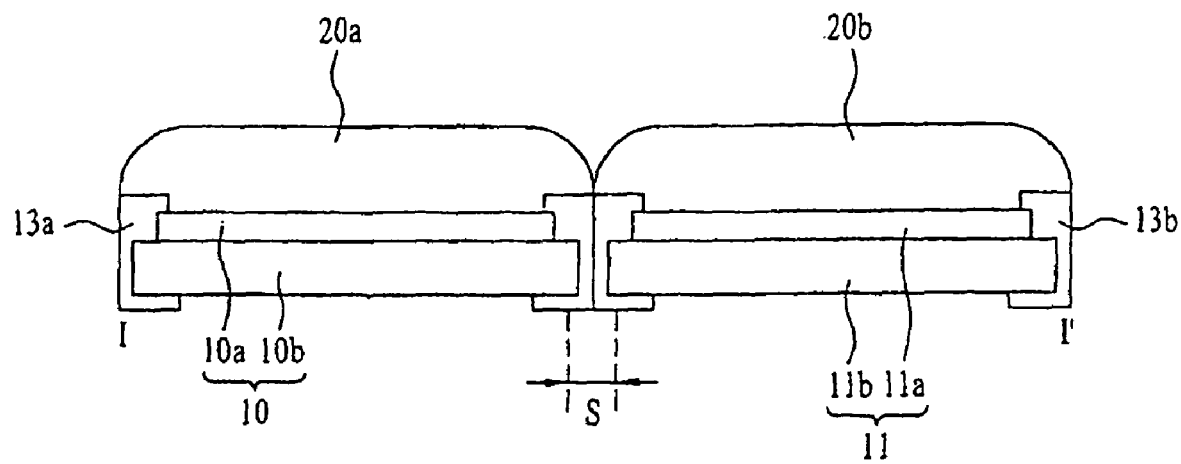
FIG. 2 illustrates a cross-sectional diagram taken along a cutting line I-I' in FIG. 1.
Figure 3:
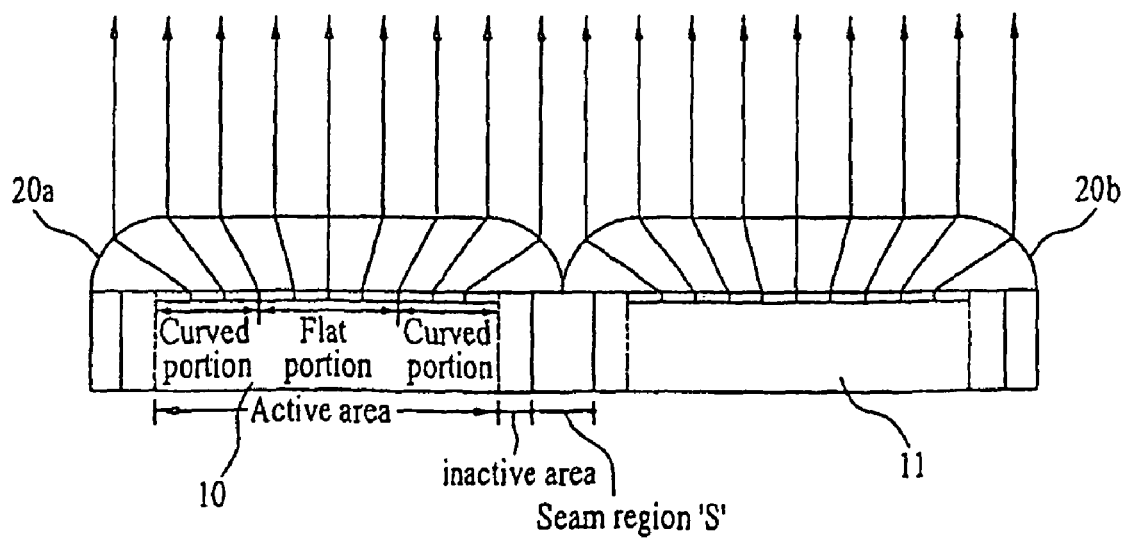
FIG. 3 illustrates a cross-sectional diagram for explaining light projection from the liquid crystal display device according to the related art.

A luminance difference compensating method according to an embodiment of the present invention relates to a method of reducing a luminance difference between the curved portion, the flat portion, and the seam region without the need to adjust the widths of the black matrix layers of the curved and flat portions. For example, it may be that the pixel size of the curved portion of each of a plurality of LCD modules, e.g., the first and second LCD modules in FIG. 3, is designed smaller than that of the flat portion, but the widths of the black matrix layers of the curved and flat portions may be the same.

As seen in FIG. 7A, a luminance difference between the flat portion (dotted line) and the curved portion (solid line) can occur even if the gray level is the same.

An embodiment of a method to prevent this from occurring is characterized in that the gray level of data inputted to a data line corresponding to a pixel area of the curved portion is raised to a level higher than that of the flat portion by converting RGB data of the pixels corresponding to the curved portion so that a desired result is achieved. The converted RGB data may then be outputted to the source driver IC 63.

The method may include the steps of receiving RGB data of the $1^{st}$ to $n^{th}$ pixel areas (for example from a timing controller), determining gray differences by which luminances of curved and flat portions become equal or nearly equal for each luminance (for example by using a lookup table), outputting the RGB data of a plurality of pixel areas corresponding to the flat portion (for example to a source driver IC), converting the RGB data of a plurality of the pixel areas corresponding to the curved portion based on the determined gray differences (for example by a data converting unit), and outputting the converted RGB data corresponding to the curved portion (for example to the source driver IC). The source driver IC may be utilized to output the RGB data of the flat portion and the converted RGB data of the curved portion to the n data lines of the LCD panel.

FIG. 6 shows an example of an LCD panel 64 having 1-384 data lines.

In the above-explained method, the gray difference of the curved portion by which the luminance becomes equal to that of the flat portion can be found by the graph in FIG. 7B. When the gray of the curved portion is converted by the gray difference as determined by the lookup table, the luminance difference between the curved and flat portions, as shown in FIG. 7C, is reduced or eliminated.

Thus, by storing the gray difference of the curved portion having the same luminance of the flat portion in the record/output unit 62a of the lookup table 62 for each luminance and by raising the gray level of the data of the curved portion by the stored gray difference, the luminance differences between the flat and curved portions may be reduced or eliminated.

Accordingly, the embodiments of the present invention provides the following effects or advantages.

First, by adjusting the pixel size and black matrix widths of the pixels of the LCD panel corresponding to the flat and curved portions of the microlens, the luminance differences between the curved portion, the flat portion and the seam region S may be reduced or eliminated. Thus, luminance uniformity can be achieved for a wide area LCD display device.

Second, by adjusting the gray level applied to the RGB data of the LCD panel corresponding to the flat and curved portions of the microlens, the luminance differences for each pixel position can be reduced or eliminated.

It should also be noted that both techniques may be utilized simultaneously. For example, the gray level may be adjusted and the widths black matrix layers may be adjusted to achieve even finer control.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   a plurality of LCD modules tiled together;
   a microlens on each of the plurality of LCD modules, wherein each of the microlenses has a curved portion and a flat portion;
   a timing controller for outputting RGB data;
   a lookup table for separating the RGB data corresponding to the curved and flat portions of each of the microlenses, for converting the RGB data of the curved portion, and for outputting the RGB data corresponding to the flat portion and the converted RGB data corresponding to the curved portion; and
   a source driver IC storing the RGB data corresponding to the flat portion and the converted RGB data corresponding to the curved portion in a register to output to data lines of each of the LCD modules.

2. The liquid crystal display device of claim 1, wherein the lookup table comprises:
   a record/output unit for recording the RGB data from the timing controller, for separating the RGB data into RGB data corresponding to the curved portion of the microlens and RGB data corresponding to the flat portion of the microlens, and for outputting the RGB data corresponding to the flat portion of the microlens to the source driver IC; and
   a data converting unit for converting the RGB data corresponding to the curved portion of the microlens from the record/output unit and for outputting the converted RGB data to the source driver IC.

3. The liquid crystal display device of claim 2, wherein the record/output unit determines a gray level difference such that a luminance of the curved portion becomes equal or substantially equal to a luminance of the flat portion, and
   wherein the data converting unit raises the gray level of the RGB data corresponding to the curved portion by the determined gray difference and outputs the raised RGB data to the source driver IC.

4. In a liquid crystal display device including a plurality of LCD modules tiled together and a microlens on each of the plurality of the LCD modules, each of the microlenses having a curved portion and a flat portion, a luminance difference compensating method comprising the steps of:
- determining a per luminance gray difference by which luminances of the curved and flat portions become equal;
- converting data corresponding to the curved portion of the microlens by the determined gray difference; and
- outputting the data corresponding to the flat portion of the microlens and the converted data corresponding to the curved portion of the microlens to each data line of the corresponding LCD module.

5. The method of claim 4, wherein the per luminance gray difference is performed through a lookup table.

6. A method for compensating for a luminance variance in a liquid crystal display device, wherein the liquid crystal display device includes a plurality of LCD modules tiled together and a microlens on each of the plurality of the LCD modules, each of the microlenses having a curved portion and a flat portion, the method comprising:
- receiving RGB data;
- determining a gray difference for which a luminance of curved and flat portions become equal or substantially equal for each luminance; and
- converting the RGB data of pixels corresponding to the curved portion based on the determined gray differences.

7. The method of claim 6, further comprising:
- outputting the RGB data of pixels corresponding to the flat portion; and
- outputting the converted RGB data of pixels corresponding to the curved portion.

* * * * *